United States Patent
Segawa et al.

(10) Patent No.: US 9,340,421 B2
(45) Date of Patent: May 17, 2016

(54) HYDROGEN SUPPLY SYSTEM (71) Applicant: JX NIPPON OIL & ENERGY CORPORATION, Tokyo (JP)

(72) Inventors: Atsushi Segawa, Tokyo (JP); Hideshi Iki, Tokyo (JP); Junji Okazaki, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 14/432,036

(22) PCT Filed: Oct. 1, 2013

(86) PCT No.: PCT/JP2013/076729
§ 371 (c)(1),
(2) Date: Mar. 27, 2015

(87) PCT Pub. No.: WO2014/054650
PCT Pub. Date: Apr. 10, 2014

(65) Prior Publication Data
US 2015/0259201 A1 Sep. 17, 2015

(30) Foreign Application Priority Data
Oct. 3, 2012 (JP) .................. 2012-221375

(51) Int. Cl.
*B01J 19/00* (2006.01)
*B01J 19/24* (2006.01)
(Continued)

(52) U.S. Cl.
CPC . *C01B 3/26* (2013.01); *B01J 19/24* (2013.01); *C01B 3/22* (2013.01); *C01B 3/501* (2013.01);
(Continued)

(58) Field of Classification Search
CPC .. B01J 19/00; B01J 19/24; B01J 2219/00049; B01J 2219/00051; B01J 2219/00074; B01J 2219/24; C01B 3/00; C01B 3/02; C01B 3/22; C01B 3/24; C01B 3/26; C01B 3/501; C01B 2203/02; C01B 2203/0266; C01B 2203/0277; C01B 2203/04; C01B 2203/0405; C01B 2203/08; C01B 2203/0805; C01B 2203/12–2203/1211; C01B 2203/1235; H01M 8/06–8/0612; H01M 8/0662; H01M 8/0687; H01M 2250/00; H01M 2250/20; Y02T 90/30; Y02T 90/32
See application file for complete search history.

(56) References Cited

U.S. PATENT DOCUMENTS 5,733,518 A * 3/1998 Durante ................ B01J 8/0453
423/248

FOREIGN PATENT DOCUMENTS

| JP | 2002-212575 A | 7/2002 |
| JP | 2005-035842 A | 2/2005 |

(Continued)

OTHER PUBLICATIONS

Machine translation of JP 2005-035842 A, which was published Feb. 10, 2005, and included as part of IDS filed May 29, 2015.*

(Continued)

*Primary Examiner* — Natasha Young
(74) *Attorney, Agent, or Firm* — Greenblum & Bernstein, P.L.C.

(57) ABSTRACT

A hydrogen supply system for supplying hydrogen comprises a reaction unit for producing a hydrogen-containing gas by a dehydrogenation reaction of a starting material, a heat supply unit for supplying heat to the reaction unit, a removal unit for removing through membrane separation a dehydrogenation product from the hydrogen-containing gas produced by the reaction unit, and a first off-gas line for supplying a part or whole of an off-gas from the removal unit to the reaction unit.

7 Claims, 5 Drawing Sheets

(51) Int. Cl.
- *C01B 3/00* (2006.01)
- *C01B 3/02* (2006.01)
- *C01B 3/22* (2006.01)
- *C01B 3/24* (2006.01)
- *C01B 3/26* (2006.01)
- *H01M 8/06* (2006.01)
- *C01B 3/50* (2006.01)
- *H01M 8/00* (2006.01)

(52) U.S. Cl.
CPC ........ *H01M 8/06* (2013.01); *B01J 2219/00074* (2013.01); *B01J 2219/24* (2013.01); *C01B 2203/0266* (2013.01); *C01B 2203/0277* (2013.01); *C01B 2203/0405* (2013.01); *C01B 2203/0805* (2013.01); *C01B 2203/1211* (2013.01); *C01B 2203/1235* (2013.01); *H01M 8/0612* (2013.01); *H01M 8/0687* (2013.01); *H01M 2250/20* (2013.01); *Y02T 90/32* (2013.01)

(56) References Cited

FOREIGN PATENT DOCUMENTS

| | | |
|---|---|---|
| JP | 2006-232607 A | 9/2006 |
| JP | 2007-153726 A | 6/2007 |

OTHER PUBLICATIONS

International Search report issued with respect to application No. PCT/JP2013/076729, mail date is Dec. 10, 2013.

International Preliminary Report on Patentability issued with respect to application No. PCT/JP2013/076729, mail date Apr. 16, 2015.

* cited by examiner

HYDROGEN SUPPLY SYSTEM

TECHNICAL FIELD

The present invention relates to a hydrogen supply system for supplying hydrogen.

BACKGROUND ART

Known as an example of conventional hydrogen supply systems is one disclosed in Patent Literature 1. The hydrogen supply system of Patent Literature 1 comprises a tank for storing a hydride of a starting aromatic hydrocarbon, a reactor for producing hydrogen by a dehydrogenation reaction of the starting material supplied from the tank, a purification means for purifying the hydrogen produced by the reactor, and a burner for heating the reactor. An off-gas from the purification means is supplied to the burner and utilized as a fuel for the burner. Here, using a dehydrogenation catalyst in the reactor in coexistence with hydrogen has been known to improve durability of the dehydrogenation catalyst. For such improvement in durability, a method for performing a dehydrogenation reaction in a reactor in coexistence with hydrogen by using a hydrogen supply system as in Patent Literature 1 so as to supply the reactor with a part of high-purity hydrogen obtained by the purification means has been known.

CITATION LIST

Patent Literature

Patent Literature 1: Japanese Patent Application Laid-Open No. 2006-232607

SUMMARY OF INVENTION

Technical Problem

However, the method supplying the reactor with purified hydrogen has a problem that the high-purity hydrogen obtained from the hydrogen supply system decreases. Also, since the off-gas from the purification means is used as a fuel for the burner, a part of the hydrogen obtained by the dehydrogenation reaction in the reactor is not supplied as high-purity hydrogen, but is consumed as the fuel for the burner. This may require the reactor to be made larger according to the hydrogen recovery in the purification means in order to supply a desirable amount of high-purity hydrogen. In view of the foregoing, reactors for performing the dehydrogenation reaction have been demanded to improve their durability without being made larger.

It is therefore an object of the present invention to improve durability of a reactor for performing a dehydrogenation reaction without making the reactor larger.

Solution to Problem

The hydrogen supply system in accordance with one mode of the present invention is a hydrogen supply system for supplying hydrogen, the hydrogen supply system comprising a reaction unit for producing a hydrogen-containing gas by a dehydrogenation reaction of a starting material, a heat supply unit for supplying heat to the reaction unit, a removal unit for removing through membrane separation a dehydrogenation product from the hydrogen-containing gas produced by the reaction unit, and a first off-gas line for supplying a part or whole of an off-gas from the removal unit to the reaction unit.

The hydrogen supply system in accordance with one mode of the present invention comprises the first off-gas line for supplying a part or whole of the off-gas from the removal unit to the reaction unit. The first off-gas line supplying the hydrogen-containing off-gas to the reaction unit enables the dehydrogenation reaction in the reaction unit to be performed in coexistence with hydrogen. The off-gas is a gas from which the removal unit has failed to remove the dehydrogenation product in the hydrogen gas from the reaction unit. Therefore, supplying the off-gas to the reaction unit through the first off-gas line so as to enable the removable unit to remove the dehydrogenation product again can yield the aimed amount of hydrogen without making the reaction unit larger even when the removal efficiency is low in the removal unit. The foregoing can improve the durability of the reaction unit for performing the dehydrogenation reaction without making the reaction unit larger.

Here, a transmitted gas (purified gas) having passed through a membrane lowers its pressure, whereas a non-transmitted gas having failed to pass through the membrane does not lower its pressure. Thus, the transmitted gas lowers its pressure so that, when supplying the reaction unit with hydrogen from which the dehydrogenation product has been removed by the removal unit as conventionally done, a compression unit for supplying the hydrogen to the reaction unit may be necessary depending on the pressure of hydrogen from the removal unit. However, the inventors have found the following structure while taking account of the fact that using a removal unit for removing a dehydrogenation product from a hydrogen-containing gas through membrane separation makes it necessary to raise a pressure under which the hydrogen-containing gas from the reaction unit is transferred to the removal unit, while the non-transmitted gas having failed to pass through the membrane keeps a high pressure, whereby the pressure of the off-gas increases. That is, it is preferred for the hydrogen supply system in accordance with the present invention to further comprise a compression unit, disposed between the reaction unit and removal unit, for transferring under pressure the hydrogen-containing gas from the reaction unit to the removal unit, the compression unit being adapted to transfer under pressure the off-gas passing through the first off-gas line to the reaction unit, only the compression unit disposed between the reaction unit and removable unit being the compression unit adapted to transfer under pressure the off-gas passing through the first off-gas line to the reaction unit. This makes it unnecessary to separately provide a compression unit for supplying hydrogen to the reaction unit.

The hydrogen supply system in accordance with another mode of the present invention may further comprise a gas-liquid separation unit, disposed between the reaction unit and removal unit, for separating the dehydrogenation product from the hydrogen-containing gas and a second off-gas line for supplying a part or whole of the off-gas from the removal unit to the gas-liquid separation unit. Providing the second off-gas line enables the part of off-gas from the removal unit not supplied to the reaction unit through the first off-gas line to be fed to the gas-liquid separation unit instead of being utilized as a fuel for a heat source. This makes it possible for the removal unit to recollect the hydrogen left in the off-gas without being collected thereby, which can improve the hydrogen recovery of the hydrogen supply system as a whole.

The hydrogen supply system in accordance with another mode of the present invention may further comprise a gas-liquid separation unit, disposed between the reaction unit and removal unit, for separating the dehydrogenation product from the hydrogen-containing gas and a first heat exchange unit for supplying heat of the hydrogen-containing gas directed from the reaction unit to the gas-liquid separation unit to the hydrogen-containing gas directed from the gas-liquid separation unit to the removal unit or the hydrogen gas in the first off-gas line. The hydrogen-containing gas from the reaction unit has a high temperature, whereas the hydrogen gas in the gas-liquid separation unit has a low temperature, which makes it necessary to raise the temperature again in the removal unit where membrane separation is performed (or, when the membrane temperature in the removal unit is made low, it is preferred for the hydrogen-containing gas in the first off-gas line to raise the temperature, since the reaction unit for which the first off-gas line is destined has a high temperature, while the temperature of the removal unit is not made high). Therefore, the first heat exchange unit can heat the removal unit (or the hydrogen-containing gas in the first off-gas line) with the heat of the hydrogen-containing gas directed from the reaction unit to the gas-liquid separation unit, thereby improving the heat utilization efficiency in the hydrogen supply system.

The hydrogen supply system in accordance with another mode of the present invention may further comprise a second heat exchange unit for supplying heat of the off-gas passing through the second off-gas line to the hydrogen-containing gas directed from the gas-liquid separation unit to the removal unit. While the off-gas from the removal unit has a high temperature, the temperature of the hydrogen-containing gas is low in the gas-liquid separation unit to which the off-gas is supplied through the second off-gas line, which makes it necessary to raise the temperature again in the removal unit where membrane separation is performed. Therefore, the second heat exchange unit can heat the removal unit with the heat of the off-gas in the second off-gas line, thereby improving the heat utilization efficiency.

ADVANTAGEOUS EFFECTS OF INVENTION

The present invention can improve the durability of the reaction unit for performing the dehydrogenation reaction without making the system larger.

DESCRIPTION OF EMBODIMENTS

In the following, preferred embodiments of the present invention will be explained in detail with reference to the drawings.

First Embodiment

Figure 1:
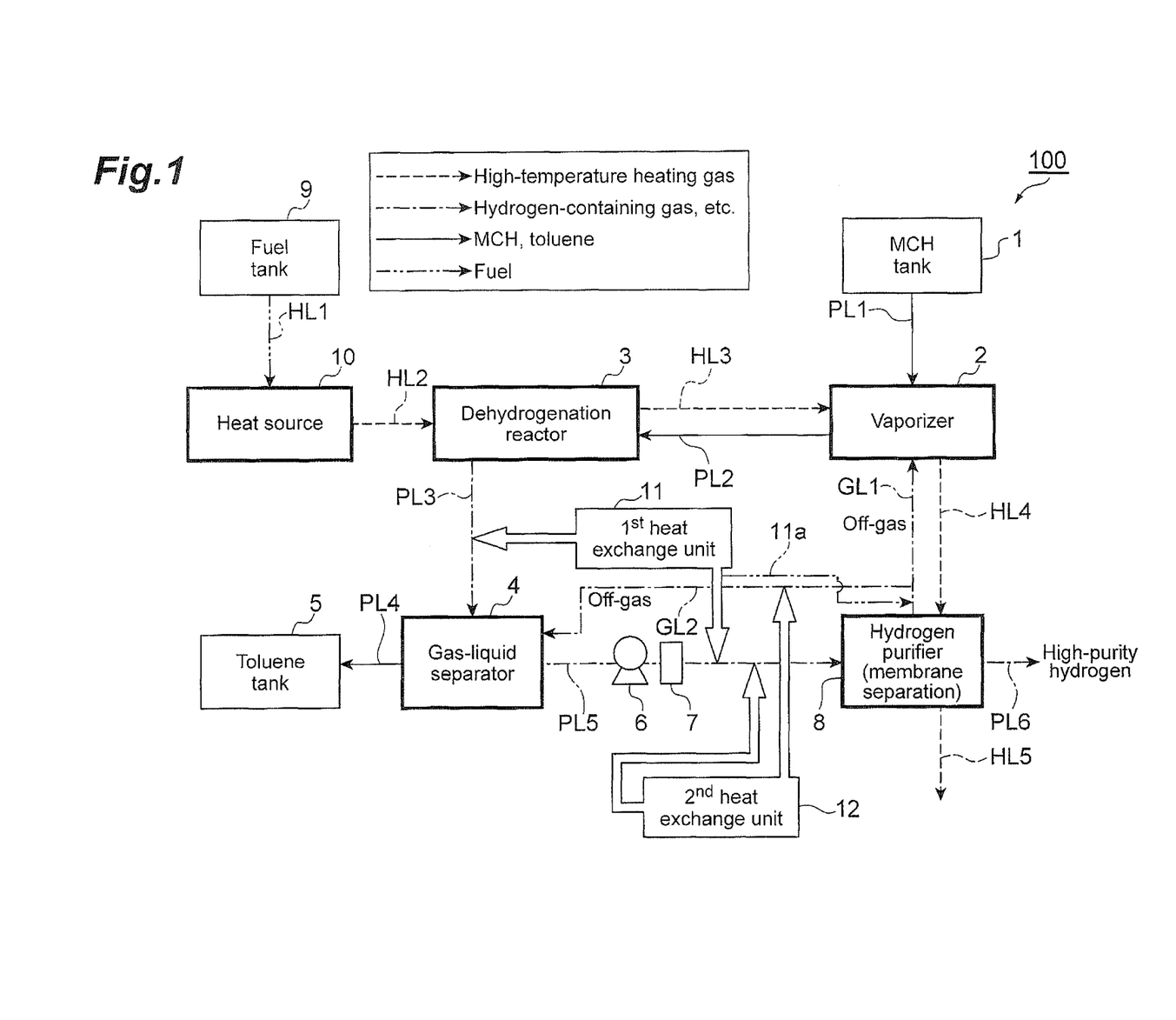
FIG. 1 is a block diagram illustrating a structure of a hydrogen supply system in accordance with a first embodiment of the present invention.

FIG. 1 is a block diagram illustrating a structure of a hydrogen supply system in accordance with the first embodiment of the present invention. The hydrogen supply system 100 in accordance with the first embodiment employs an organic compound (which is a liquid at ambient temperature) as a starting material. Its hydrogen purification process removes dehydrogenation products (which are liquids at ambient temperature) (organic compounds (which are liquids at ambient temperature)) of a starting organic compound (which is a liquid at ambient temperature). Examples of the starting organic compound include organic hydrides. Preferred examples of the organic hydrides are hydrides obtained by a reaction of hydrogen, which is produced by large amounts in oil refineries, with aromatic hydrocarbons. The organic hydrides are not limited to aromatic hydrogenation compounds, but include those based on 2-propanol (generating hydrogen and acetone). The organic hydrides can be transported to the hydrogen supply system 100 as a liquid fuel as with gasoline and so forth by tank trucks and the like. This embodiment uses methylcyclohexane (hereinafter referred to as MCH) as an organic hydride. Hydrides of aromatic hydrocarbons such as cyclohexane, dimethylcyclohexane, ethylcyclohexane, decalin, methyldecalin, dimethyldecalin, and ethyldecalin can also be employed as the organic hydrides (the aromatic compounds being preferred examples having a high hydrogen content in particular). The hydrogen supply system 100 can supply hydrogen to fuel cell vehicles and hydrogen-powered vehicles.

As illustrated in FIG. 1, the hydrogen supply system 100 in accordance with this embodiment comprises an MCH tank 1, a vaporizer 2, a dehydrogenation reactor (reaction unit) 3, a gas-liquid separator (gas-liquid separation unit) 4, a toluene tank 5, a hydrogen purification compressor 6, a gas-liquid separator 7, a hydrogen purifier (removal unit) 8, a fuel tank 9, a heat source (heat supply unit) 10, and a first heat exchange unit 11. The hydrogen supply system 100 also comprises material lines PL1 to PL6, heating lines HL1 to HL5, and off-gas lines (first and second off-gas lines) GL1, GL2. In this embodiment, a case in which MCH is employed as a starting material while toluene is the dehydrogenation product removed in the hydrogen purification process will be explained as an example. Unreacted MCH and small amounts of byproducts exist in addition to toluene in practice, but are mixed in toluene and behave in the same manner as with toluene in this embodiment. Therefore, the one explained as "toluene" in the following includes the unreacted MCH and byproducts.

The material lines PL1 to PL6 are lines through which MCH, toluene, a hydrogen-containing gas, or high-purity hydrogen passes. The material line PL1 connects the MCH tank 1 to the vaporizer 2, the material line PL2 connects the vaporizer 2 to the dehydrogenation reactor 3, the material line PL3 connects the dehydrogenation reactor 3 to the gas-liquid separator 4, the material line PL4 connects the gas-liquid separator 4 to the toluene tank 5, the material line PL5 connects the gas-liquid separator 4 to the hydrogen purifier 8, and the material line PL6 connects the hydrogen purifier 8 to an external hydrogen consumption device or hydrogen supply device (not depicted). The hydrogen purification compressor 6 and gas-liquid separator 7 are located at a middle position in the material line PL5.

The heating lines HL1 to HL5 are lines through which a fuel or a high-temperature heating gas passes. The heating line HL1 connects the fuel tank 9 to the heat source 10, the heating line HL2 connects the heat source 10 to the dehydrogenation reactor 3, the heating line HL3 connects the dehydrogenation reactor 3 to the vaporizer 2, the heating line HL4 connects the vaporizer 2 to the hydrogen purifier 8, and the heating line HL5 connects the hydrogen purifier 8 to an undepicted external device (e.g., an exhaust gas processor or a device for recovering and utilizing heat).

The off-gas line GL1 is a line for supplying a part or whole of an off-gas from the hydrogen purifier 8 to the dehydrogenation reactor 3 through the vaporizer 2. The off-gas line GL1 connects the hydrogen purifier 8 to the vaporizer 2. The off-gas line GL2 is a line for supplying a part or whole of an off-gas from the hydrogen purifier 8 to the gas-liquid separator 4. The off-gas line GL2 connects a middle position of the off-gas line GL1 to the gas-liquid separator 4.

The MCH tank 1 is a tank for storing MCH serving as a starting material. MCH transported from the outside by a tank truck or the like is stored in the MCH tank 1. MCH stored in the MCH tank 1 is supplied through the material line PL1 to the vaporizer 2 by a pump (not depicted).

The vaporizer 2 is a device for vaporizing MCH supplied from the MCH tank 1 by using an injector or the like. Vaporized MCH, together with the off-gas supplied from the hydrogen purifier 8 through the off-gas line GL1, is fed to the dehydrogenation reactor 3 through the material line PL2.

The dehydrogenation reactor 3 is a device for yielding hydrogen by a dehydrogenation reaction of MCH. That is, the dehydrogenation reactor 3 is a device for taking out hydrogen from MCH by a dehydrogenation reaction using a dehydrogenation catalyst. The reaction of an organic hydride is reversible, so that the direction of the reaction changes depending on conditions of the reaction (temperature and pressure) (restricted by chemical equilibrium). On the other hand, the dehydrogenation reaction is always an endothermic reaction and increases the number of molecules. Therefore, high-temperature, low-pressure conditions are advantageous. Hence no compressor is necessary for the dehydrogenation reactor 3 to attain a high pressure. Since the dehydrogenation reaction is an endothermic reaction, the dehydrogenation reactor 3 is supplied with heat through the high-temperature heating gas from the heat source 10. The dehydrogenation reactor 3 has a mechanism by which heat is exchangeable between MCH flowing through the dehydrogenation catalyst and the high-temperature heating gas from the heat source 10. The hydrogen-containing gas taken out by the dehydrogenation reactor 3 is supplied through the material line PL3 to the gas-liquid separator 4. The hydrogen-containing gas in the material line PL3 is supplied to the gas-liquid separator 4 while containing liquid toluene in a mixture.

The gas-liquid separator 4 is a tank for separating toluene from the hydrogen-containing gas. By storing the hydrogen-containing gas including toluene as a mixture, the gas-liquid separator 4 separates hydrogen and toluene from each other as a gas and a liquid, respectively. Toluene separated by the gas-liquid separator 4 is supplied through the material line PL4 to the toluene tank 5. The hydrogen-containing gas separated by the gas-liquid separator 4 is transferred under pressure by the hydrogen purification compressor 6 through the material line PL5 to the gas-liquid separator 7 and further to the hydrogen purifier 8. When the hydrogen-containing gas is cooled, a part (toluene) of the gas liquefies and thus is separated from a nonliquefied gas (hydrogen gas) by the gas-liquid separators 4, 7. Lower temperature yields higher efficiency in separation, and higher pressure is preferred since toluene is further liquefied thereby.

The toluene tank 5 is a tank for storing liquid toluene separated by the gas-liquid separator 4. Toluene stored in the toluene tank 5 can be recovered for utilization.

Under a predetermined pressure, the hydrogen purification compressor 6 transfers the hydrogen-containing gas separated by the gas-liquid separator 4 to the hydrogen purifier 8. Since the hydrogen purifier 8 in accordance with this embodiment is of such a type as to remove toluene from the hydrogen-containing gas through membrane separation, the hydrogen purification compressor 6 transfers the hydrogen-containing gas under a high pressure. Specifically, the hydrogen purification compressor 6 transfers the hydrogen-containing gas at 0.2 to 5.0 MPa. Since toluene partly liquefies when the pressure rises, the gas-liquid separator 7 is installed, so as to separate the hydrogen-containing gas and toluene from each other as a gas and a liquid in front of the hydrogen purifier 8.

Through membrane separation, the hydrogen purifier 8 removes the hydrogenation product (toluene in this embodiment) from the hydrogen-containing gas obtained by the dehydrogenation reactor 3 and separated as a gas from a liquid by the gas-liquid separators 4, 8. As a consequence, the hydrogen purifier 8 purifies the hydrogen-containing gas, so as to yield a high-purity hydrogen gas. By passing the hydrogen-containing gas pressurized at a predetermined pressure through a membrane heated at a predetermined temperature, the hydrogen purifier 8 can remove the dehydrogenation product, thereby yielding high-purity hydrogen. The hydrogen recovery of the hydrogen purifier 8 through membrane separation is 85 to 95%. The hydrogen/toluene separation factor of the membrane used in the hydrogen purifier 8 is preferably 1000 or greater, more preferably 10000 or greater. When the hydrogen/toluene separation factor is 10000 or greater, the hydrogen/methane separation factor of the membrane is 1000 or greater. The high-purity hydrogen gas obtained by passing through the membrane is supplied to the material line PL6.

The membrane employed in the hydrogen purifier 8 is not limited in particular in tennis of types and can be any of porous membranes (for separation by molecular flows, surface diffusion flows, capillary condensation actions, molecular sieve actions, and so forth) and nonporous membranes. Examples of the membrane employable in the hydrogen purifier 8 include metal membranes (such as those based on PdAg, PdCu, and Nb), zeolite membranes, inorganic membranes (such as silica membranes and carbon membranes), and polymer membranes (such as polyimide membranes). However, preferred types of membranes vary depending on the system structure of the hydrogen supply system (as will be explained later in detail).

The transmitted gas (purified gas) having passed through the membrane of the hydrogen purifier 8 lowers its pressure, whereas the non-transmitted gas having failed to pass through the membrane does not lower its pressure. The non-transmitted gas having failed to pass through the membrane of the hydrogen purifier 8 is supplied to the off-gas line GL1 or GL2 as an off-gas including hydrogen and the dehydrogenation product. According to the amount of hydrogen required in the dehydrogenation reactor 3, the off-gas line GL1 supplies a part or whole of the off-gas in the hydrogen purifier 8 to the dehydrogenation reactor 3 through the vaporizer 2. When supplying the whole off-gas to the dehydrogenation reactor 3, no off-gas flows to the off-gas line GL2. When supplying a part of the off-gas to the dehydrogenation reactor 3, the remainder of the off-gas is supplied through the off-gas line GL2 to the gas-liquid separator 4. Alternatively, at a timing when no supply of hydrogen to the dehydrogenation reactor 3 is necessary so that the hydrogen supply through the off-gas line GL1 is stopped, the whole off-gas is supplied through the off-gas line GL2 to the gas-liquid separator 4.

As mentioned above, for membrane separation in the hydrogen purifier 8, the hydrogen purification compressor 6 transfers the hydrogen-containing gas under such a high pressure as to enable membrane separation. The transmitted gas (purified gas) having passed through the membrane of the hydrogen purifier 8 lowers its pressure, whereas the non-transmitted gas (off-gas) having failed to pass through the membrane does not lower its pressure. Therefore, the off-gas from the hydrogen purifier 8 also keeps a high pressure state. This makes it preferable that the off-gas lines GL1, GL2 be free of compressors so that the off-gas passing through the off-gas line GL1 is supplied to the vaporizer 2 and dehydrogenation reactor 3 under the pressure of the hydrogen purification compressor 6 alone while the off gas passing through the off-gas line GL2 is supplied to the gas-liquid separator 4 under the pressure of the hydrogen purification compressor 6 alone.

The fuel tank 9 is a tank for storing a fuel to be supplied to the heat source 10. The heat source 10 heats the dehydrogenation reactor 3 by using the fuel supplied from the fuel tank 9. Any type of the heat source 10 can be employed as long as it can heat the dehydrogenation reactor 3. For example, a burner or an engine may be employed as the heat source 10 such that the dehydrogenation reactor 3 is heated with a high-temperature gas generated by the burner or a high-temperature exhaust gas emitted by the engine.

The first heat exchange unit 11 supplies the hydrogen-containing gas directed from the gas-liquid separator 4 to the hydrogen purifier 8 with the heat of the hydrogen-containing gas directed from the dehydrogenation reactor 3 to the gas-liquid separator 4. As a consequence, the hydrogen-containing gas directed to the hydrogen purifier 8 is heated by the first heat exchange unit 11.

The heating structure of the hydrogen supply system 100 will now be explained. First, the high-temperature heating gas produced by the heat source 10 is supplied through the heating line HL2 to the dehydrogenation reactor 3. The high-temperature heating gas provides heat for heating the dehydrogenation reactor 3 for a dehydrogenation reaction which is an endothermic reaction. The part for performing the dehydrogenation reaction in the dehydrogenation reactor 3 preferably has a temperature of 250 to 450° C. The high-temperature heating gas emitted from the dehydrogenation reactor 3 is supplied through the heating line HL3 to the vaporizer 2. The high-temperature heating gas provides heat for heating the vaporizer 2 so as to vaporize MCH. The vaporizing part in the vaporizer 2 preferably has a temperature of 100 to 300° C. The high-temperature heating gas emitted from the vaporizer 2 is supplied through the heating line HL4 to the hydrogen purifier 8. The high-temperature heating gas provides heat for heating the hydrogen purifier 8 so that the latter attains a temperature suitable for membrane separation. The high-temperature heating gas emitted from the hydrogen purifier 8 is supplied through the heating line HL5 to an external device (not depicted). Such a heating structure places the dehydrogenation reactor 3, vaporizer 2, and hydrogen purifier 8 in descending order of temperature.

The temperature at which the membrane of the hydrogen purifier 8 is preferably employed varies depending on the type of the membrane. For example, a preferred temperature is 400 to 600° C. for PdAg-based metal membranes, 200 to 400° C. for PdCu-based metal membranes, and 200 to 400° C. for Nb-based metal membranes. A preferred temperature is ambient temperature to 200° C. for zeolite, inorganic, and polymer membranes. It is therefore preferred for the heating temperature of the hydrogen purifier 8 to be adjusted according to the type of the membrane. The heating temperature is adjusted by providing an undepicted cooling mechanism or heat exchange mechanism upstream of the hydrogen purifier 8 (upstream of the high-temperature heating gas). When the temperature at which the membrane is employed is higher than that of the dehydrogenation reactor 3 or vaporizer 2, such a heating structure as that of a hydrogen supply system 200 in accordance with the second embodiment or a hydrogen supply system 300 in accordance with the third embodiment which will be explained later is preferably adopted in place of the heating structure of the hydrogen supply system 100 in accordance with this embodiment. When the heating structure of the hydrogen supply system 100 in accordance with this embodiment is adopted, PdCu-based metal membranes, Nb-based metal membranes, zeolite membranes, inorganic membranes, and polymer membranes are preferably employed.

For easier gas-liquid separation, it is preferred for the gas-liquid separators 4, 7 to be cooled, while the hydrogen purification compressor 6 is preferably used at ambient temperature. It is therefore preferable for a cooler (not depicted) to be disposed between the dehydrogenation reactor 3 and gas-liquid separator 4, i.e., in the material line PL3. The off-gas line GL2 may also supply the gas-liquid separator 4 with the off-gas having its temperature lowered in the cooler.

The high-temperature hydrogen-containing gas supplied from the dehydrogenation reactor 3 lowers its temperature in (or in front of) the gas-liquid separator 4, and thus cooled hydrogen-containing gas attains a high temperature again in the hydrogen purifier 8. Therefore, the first heat exchange unit 11 can effectively utilize heat by supplying the hydrogen-containing gas directed from the gas-liquid separator 4 to the hydrogen purifier 8 with the heat of the hydrogen-containing gas directed from the dehydrogenation reactor 3 to the gas-liquid separator 4. The first heat exchange unit 11 recovers heat at a middle position of the material line PL3 between the dehydrogenation reactor 3 and gas-liquid separator 4. When a cooler is provided in font of the gas-liquid separator 4, the heat is preferably recovered between the dehydrogenation reactor 3 and cooler. The first heat exchange unit 11 supplies heat at a middle position of the material line PL5 between the gas-liquid separator 4 and hydrogen purifier 8 (between the gas-liquid separator 7 and hydrogen purifier 8 in this embodiment).

Figure 5:
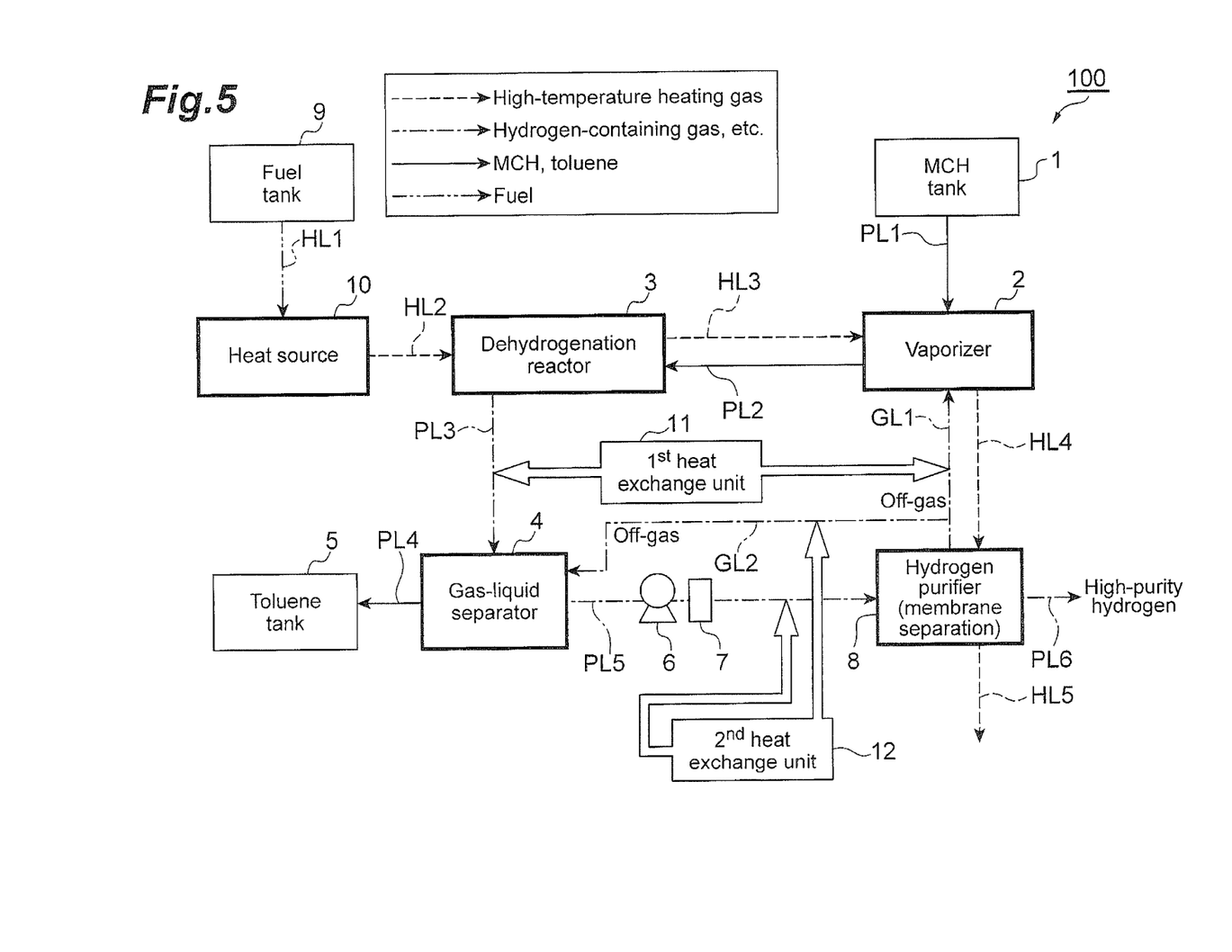
FIG. 5 is a block diagram illustrating a structure of a hydrogen supply system in accordance with a modified example of the present invention.

When the membrane of the hydrogen purifier 8 is used at a low temperature, the first heat exchange unit 11 may supply the hydrogen-containing gas in the off-gas line GL1 with the heat of the hydrogen-containing gas directed from the dehydrogenation reactor 3 to the gas-liquid separator 4 as illustrated in FIG. 5. Since the membrane is used at a low temperature, the temperature of the hydrogen-containing gas in the off-gas line GL1 is also low, whereas its destined vaporizer 2 and dehydrogenation reactor 3 have high temperatures. Therefore, the first heat exchange unit 11 can effectively utilize heat by supplying the heat at the middle position of the off-gas line GL1.

The hydrogen supply system 100 may further comprise a second heat exchange unit 12 for supplying the heat of the off-gas passing through the off-gas line GL2 to the hydrogen-containing gas directed from the gas-liquid separator 4 to the hydrogen purifier 8. The second heat exchange unit 12 can effectively utilize heat by supplying the heat of the off-gas passing through the off-gas line GL2 to the hydrogen-containing gas directed from the gas-liquid separator 4 to the hydrogen purifier 8. The second heat exchange unit 12 recovers heat at a middle position of the off-gas line GL2. When a cooler is provided in front of the gas-liquid separator 4, the heat is preferably recovered in front of the cooler. The second heat exchange unit 12 supplies heat at a middle position of the material line PL5 between the gas-liquid separator 4 and hydrogen purifier 8 (between the gas-liquid separator 7 and hydrogen purifier 8 in this embodiment). The second heat exchange unit 12 may be omitted, however. When the temperature of the hydrogen-containing gas in the off-gas line GL2 is higher than that of the hydrogen-containing gas in the material line PL3 because of the temperature at which the membrane of the hydrogen purifier 8 is employed, it is preferred for the second heat exchange unit 12 to be arranged closer to the inlet of the hydrogen purifier 8 than is the first heat exchange unit 11 in terms of positions at which they are connected to the material line PL5 (the positional relationship illustrated in FIG. 1), since this yields higher heat efficiency. When the temperature of the hydrogen-containing gas in the off-gas line GL2 is lower than that of the hydrogen-containing gas in the material line PL3 because of the temperature at which the membrane of the hydrogen purifier 8 is employed, on the other hand, it is preferred for the first heat exchange unit 11 to be arranged closer to the inlet of the hydrogen purifier 8 than is the second heat exchange unit 12 in terms of positions at which they are connected to the material line PL5, since this yields higher heat efficiency.

As for the pressure, the relationship that the pressure of the dehydrogenation reactor 3<the pressure of the off gas holds between the pressure of the dehydrogenation reactor 3 and the pressure of the off-gas.

Pressure regulating means (such as pressure regulating valves) and flow control means (such as flow control valves) may be provided in the hydrogen supply system 100 when necessary. It is preferred for them to control the reaction pressure of the dehydrogenation reactor 3 and the pressure of the membrane of the hydrogen purifier 8. It is therefore preferred (but not required) to provide the pressure regulating means and flow control means at predetermined positions. For example, the pressure regulating means and flow control means may be provided at any positions (on the off-gas line GL1) between the hydrogen purifier 8 and vaporizer 2 (dehydrogenation reactor 3). This can optimize and stabilize the pressures of the hydrogen purifier 8 and dehydrogenation reactor 3 and the flow rate of the off-gas. The pressure regulating means and flow control means (or the pressure regulating means alone in this part) may also be provided at any positions (on the material line PL3) between the dehydrogenation reactor 3 and gas-liquid separator 4. This can optimize and stabilize the pressure of the dehydrogenation reactor 3. They may be provided (on PL5) between the gas-liquid separator 4 and compressor 6. The pressure regulating means and flow control means may be provided at any positions (on the off-gas line GL2) between the hydrogen purifier 8 and gas-liquid separator 4. This can control the off-gas flow rate in the off-gas line GL2. They may be provided at one, a plurality, or all of these positions.

Operations and effects of the hydrogen supply system 100 in accordance with this embodiment will now be explained.

Figure 2:
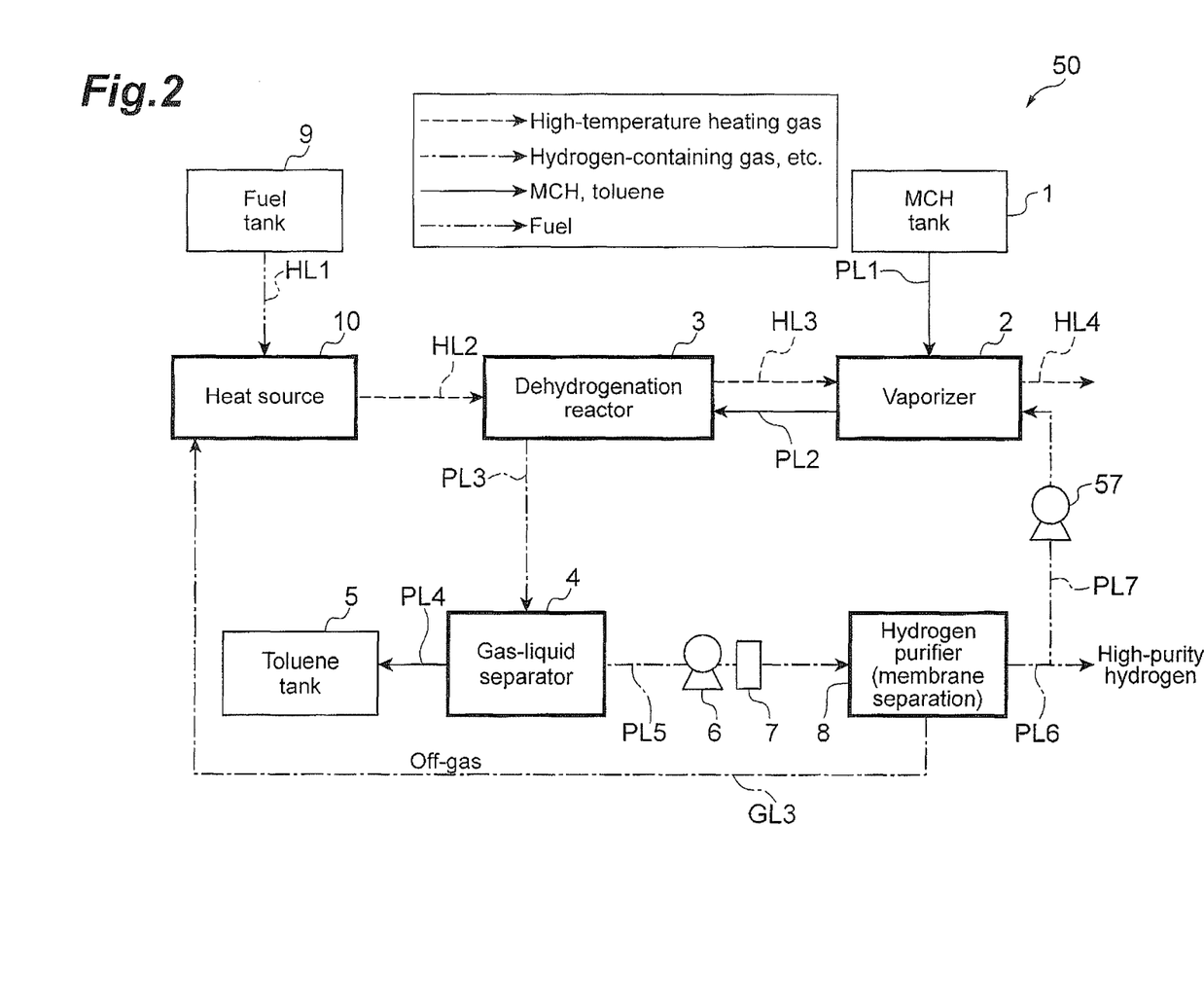
FIG. 2 is a block diagram illustrating a structure of a hydrogen supply system in accordance with a comparative example.

First, a hydrogen supply system 50 in accordance with a comparative example will be explained with reference to FIG. 2. The hydrogen supply system 50 in accordance with the comparative example supplies a part of high-purity hydrogen obtained by the hydrogen purifier 8 to the dehydrogenation reactor 3 through the vaporizer 2, so as to enable a dehydrogenation reaction in coexistence with hydrogen, thereby improving the durability of the dehydrogenation reactor 3. Specifically, in the hydrogen supply system 50, a material line PL7 for supplying high-purity hydrogen to the dehydrogenation reactor 3 is provided at a middle position of the material line PL6, while a compressor 57 for transferring high-purity hydrogen under pressure to the dehydrogenation reactor 3 is disposed on the line PL7. The off-gas from the hydrogen purifier 8 is utilized as a fuel for the heat source 10. Specifically, the hydrogen supply system 50 is equipped with an off-gas line GL3 for supplying the off-gas from the hydrogen purifier 8 to the heat source 10.

However, the hydrogen supply system 50 in accordance with the comparative example has a problem that a part of high-purity hydrogen obtained by the hydrogen purifier 8 is supplied to the dehydrogenation reactor 3 and thus decreases the amount of supply of high-purity hydrogen which is supposed to be fed immediately.

For using the off-gas from the hydrogen purifier 8 as a fuel for the heat source 10, a part of hydrogen obtained by the dehydrogenation reaction in the dehydrogenation reactor 3 is consumed as the fuel for the heat source 10 without being supplied as high-purity hydrogen. This may make it necessary for the dehydrogenation reactor 3 to become larger according to the hydrogen recovery in the hydrogen purifier 8 in order for the hydrogen supply system 50 to supply a desirable amount of high-purity hydrogen. That is, when the hydrogen recovery is low, the amount of hydrogen consumed by the heat source 10 increases, which makes it necessary to supply a greater amount of MCH from the MCH tank 1 so as to compensate therefor, thereby enhancing the amount of a dehydrogenation catalyst in the dehydrogenation reactor 3 and making the dehydrogenation reactor 3 larger.

The hydrogen supply system 50 in accordance with the comparative example further necessitates the compressor 57 for transferring the high-purity hydrogen under pressure to the dehydrogenation reactor 3. The transmitted gas (purified gas) having passed through the membrane of the hydrogen purifier 8 lowers its pressure, whereas the non-transmitted gas (off-gas) having failed to pass through the membrane does not lower its pressure. Since the transmitted gas of the hydrogen purifier 8 thus lowers the pressure, the compressor 57 is necessary.

The hydrogen supply system 100 in accordance with this embodiment is equipped with the off-gas line GL1 for supplying the dehydrogenation reactor 3 with a part or whole of the off-gas from the hydrogen purifier 8. The off-gas line GL1 supplies the off-gas containing hydrogen to the dehydrogenation reactor 3, thereby making it possible to perform the dehydrogenation reaction in the dehydrogenation reactor 3 in coexistence with hydrogen without supplying a part of high-purity hydrogen obtained by the hydrogen purifier 8 to the dehydrogenation reactor 3.

The off-gas is a gas from which the hydrogen purifier 8 has failed to remove toluene in the hydrogen gas from the dehydrogenation reactor 3. Therefore, supplying the off-gas to the dehydrogenation reactor 3 through the off-gas line GL1 enables the hydrogen purifier 8 to remove toluene again. This raises the hydrogen recovery of the hydrogen supply system 100 as a whole and thus makes it unnecessary to enhance the amount of supply of MCH from the MCH tank 1 so as to increase the amount of the dehydrogenation catalyst in the dehydrogenation reactor 3 even when the removal efficiency in the hydrogen purifier 8 is low, whereby the aimed amount of hydrogen can be obtained without making the dehydrogenation reactor 3 larger. Therefore, the dehydrogenation reactor 3 for performing the dehydrogenation reaction can improve its durability without being made larger.

Here, the transmitted gas (purified gas) having passed through the membrane of the hydrogen purifier 8 lowers its pressure, whereas the non-transmitted gas (off-gas) having failed to pass through the membrane does not lower its pressure. Since the transmitted gas of the hydrogen purifier 8 thus lowers its pressure, when supplying the dehydrogenation reactor 3 with hydrogen from which the dehydrogenation product is removed by the hydrogen purifier 8, a compression unit for feeding the hydrogen to the dehydrogenation reactor 3 may become necessary depending on the pressure of hydrogen from the hydrogen purifier 8 as in the comparative example. However, the inventors have found the following structure in view of the fact that, when using the hydrogen purifier 8 for removing the dehydrogenation product from the hydrogen-containing gas through membrane separation, the pressure under which the hydrogen-containing gas from the dehydrogenation reactor 3 is transferred to the hydrogen purifier 8 is required to be made high while the non-transmitted gas having failed to pass through the membrane keeps a high pressure, whereby the pressure of the off-gas is high. That is, the hydrogen supply system 100 in accordance with the present invention further comprises the compressor 6, disposed between the dehydrogenation reactor 3 and hydrogen purifier 8, for transferring under pressure the hydrogen-containing gas from the dehydrogenation reactor 3 to the hydrogen purifier 8, whereby the off-gas passing through the off-gas line GL1 is supplied to the dehydrogenation reactor 3 under the pressure of the hydrogen purification compressor 6 alone. This makes it unnecessary to separately provide the compressor 57 for supplying hydrogen to the dehydrogenation reactor 3.

Since the hydrogen supply system 100 in accordance with this embodiment uses the hydrogen purifier 8 for removing the dehydrogenation product from the hydrogen-containing gas through membrane separation, the pressure under which the hydrogen-containing gas from the dehydrogenation reactor 3 is transferred to the hydrogen purifier 8 is required to be made high, whereby the pressure of the off-gas becomes high. Therefore, without providing the off-gas lines GL1, GL2 with compressors, the off-gas passing through the off-gas lines GL1, GL2 can be supplied to the dehydrogenation reactor 3 under the pressure of the hydrogen purification compressor 6 alone. This can omit the compressor 57 included in the hydrogen supply system 50 in accordance with the comparative example and also make it unnecessary to provide a compressor corresponding to the compressor 57. Even when supplying hydrogen to the dehydrogenation reactor 3 for a dehydrogenation reaction in coexistence with hydrogen, the foregoing can make it unnecessary to provide a dedicated compressor therefor in the system.

The hydrogen supply system 100 in accordance with this embodiment further comprises the gas-liquid separator 4, disposed between the dehydrogenation reactor 3 and hydrogen purifier 8, for separating toluene from the hydrogen-containing gas and the off-gas line GL2 for supplying a part or whole of the off-gas from the hydrogen purifier 8 to the gas-liquid separator, thereby improving the utilization efficiency of the off-gas. That is, in the off-gas from the hydrogen purifier 8, the remainder not supplied to the dehydrogenation reactor 3 through the off-gas line GL1 is fed to the gas-liquid separator 4 instead of being utilized as a fuel for the heat source 10, which enables the hydrogen purifier 8 to recollect the hydrogen left in the off-gas without being collected by the hydrogen purifier 8. This can improve the hydrogen recovery of the hydrogen supply system as a whole.

Second Embodiment

Figure 3:
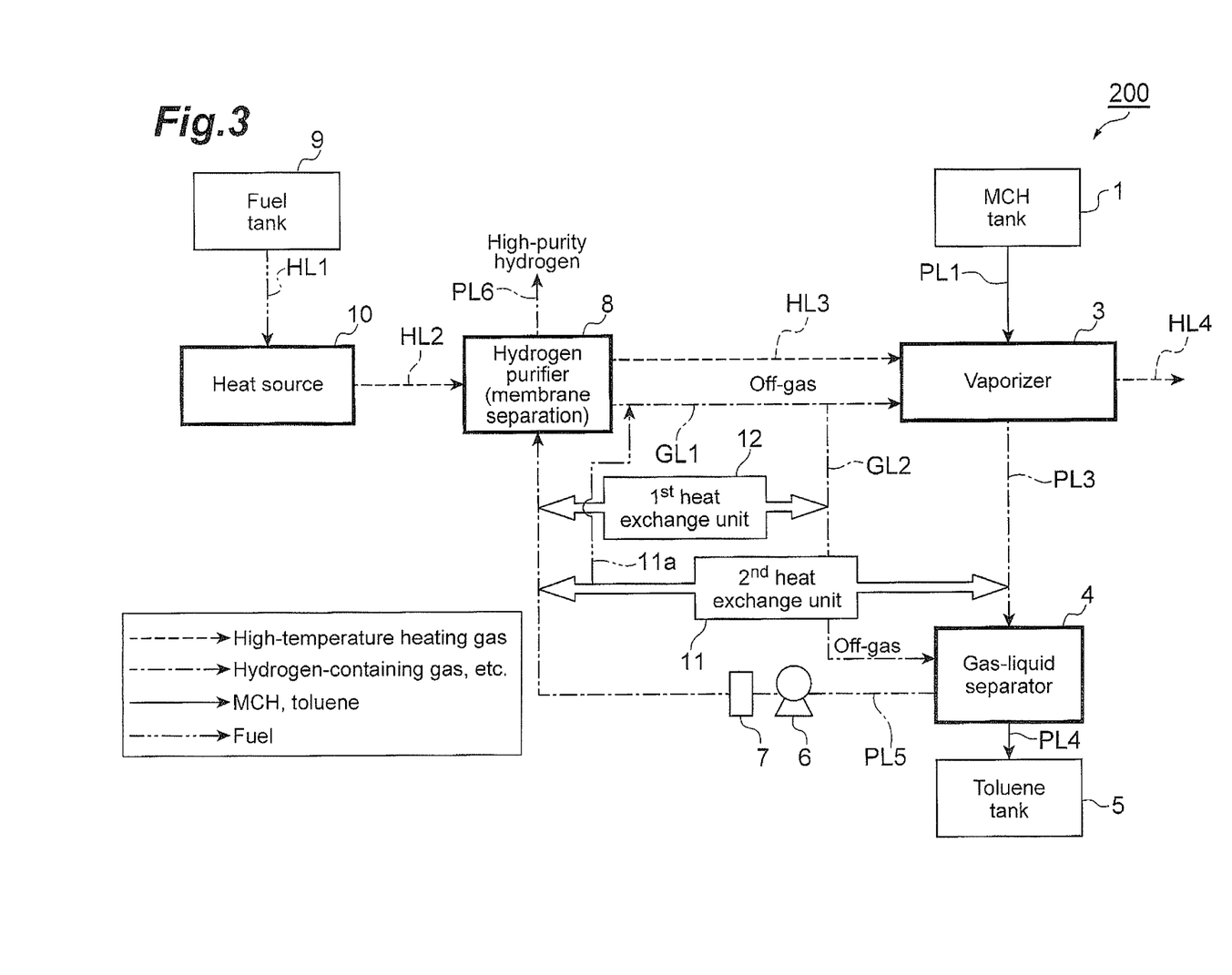
FIG. 3 is a block diagram illustrating a structure of a hydrogen supply system in accordance with a second embodiment of the present invention.

FIG. 3 is a block diagram illustrating a structure of a hydrogen supply system in accordance with the second embodiment of the present invention. The hydrogen supply system 200 in accordance with the second embodiment differs from the hydrogen supply system 100 in accordance with the first embodiment mainly in that the high-temperature heating gas from the heat source 10 heats the hydrogen purifier 8 and dehydrogenation reactor 3 in this order. The order of constituents on the material lines PL1 to PL6 is the same as that of the first embodiment (except that the vaporizer 2 and material line PL2 are omitted), and the off-gas lines GL1, GL2 are constructed as in the first embodiment.

Specifically, the high-temperature heating gas generated in the heat source 10 is supplied through the heating line HL2 to the hydrogen purifier 8. The high-temperature heating gas provides heat for heating the hydrogen purifier 8 so that the latter attains a temperature suitable for membrane separation. The high-temperature heating gas emitted from the hydrogen purifier 8 is supplied through the heating line HL3 to the dehydrogenation reactor 3. The high-temperature heating gas provides heat for heating the dehydrogenation reactor 3 for a dehydrogenation reaction which is an endothermic reaction. The high-temperature heating gas emitted from the dehydrogenation reactor 3 is supplied through the heating line HL4 to an external device (not depicted). Such a heating structure places the hydrogen purifier 8 (which yields no temperature change since membrane separation is not an endothermic reaction, but may lower temperature because of heat loss in the middle) and dehydrogenation reactor 3 in descending order of temperature.

The hydrogen supply system 200 in accordance with the second embodiment enables the hydrogen purifier 8 to attain a high temperature. Therefore, when adopting the heating structure of the hydrogen supply system 200 in accordance with this embodiment, PdAg-based metal membranes (400 to 600° C.) are preferably employed as a membrane. PdCu- and Nb-based metal membranes may also be employed.

The hydrogen supply system 200 in accordance with the second embodiment also comprises the first heat exchange unit 11. The high-temperature hydrogen-containing gas supplied from the dehydrogenation reactor 3 lowers its temperature in (or in front of) the gas-liquid separator 4, and thus cooled hydrogen-containing gas attains a high temperature again in the hydrogen purifier 8. Therefore, the first heat exchange unit 11 can effectively utilize heat by supplying the hydrogen-containing gas directed from the gas-liquid separator 4 to the hydrogen purifier 8 with the heat of the hydrogen-containing gas directed from the dehydrogenation reactor 3 to the gas-liquid separator 4. The first heat exchange unit 11 recovers heat at a middle position of the material line PL3 between the dehydrogenation reactor 3 and gas-liquid separator 4. When a cooler is provided in front of the gas-liquid separator 4, the heat is preferably recovered between the dehydrogenation reactor 3 and cooler. The first heat exchange unit 11 supplies heat at a middle position of the material line PL5 between the gas-liquid separator 4 and hydrogen purifier 8 (between the gas-liquid separator 7 and hydrogen purifier 8 in this embodiment).

The hydrogen supply system 200 in accordance with the second embodiment further comprises the second heat exchange unit 12 for supplying the heat of the off-gas passing through the off-gas line GL2 to the hydrogen-containing gas directed from the gas-liquid separator 4 to the hydrogen purifier 8. While the off-gas from the hydrogen purifier 8 has a high temperature, the hydrogen-containing gas in the gas-liquid separator 4 to which the off-gas is supplied through the off-gas line GL2 has a low temperature, which makes it necessary to raise the temperature again in the hydrogen purifier 8 where membrane separation is performed. Therefore, the second heat exchange unit 12 can effectively utilize heat by supplying the heat of the off-gas passing through the off-gas line GL2 to the hydrogen-containing gas directed from the gas-liquid separator 4 to the hydrogen purifier 8. The second heat exchange unit 12 recovers heat at a middle position of the off-gas line GL2. When a cooler is provided in front of the gas-liquid separator 4, the heat is preferably recovered in front of the cooler. The second heat exchange unit 12 supplies heat at a middle position of the material line PL5 between the gas-liquid separator 4 and hydrogen purifier 8 (between the gas-liquid separator 7 and hydrogen purifier 8 in this embodiment).

Third Embodiment

Figure 4:
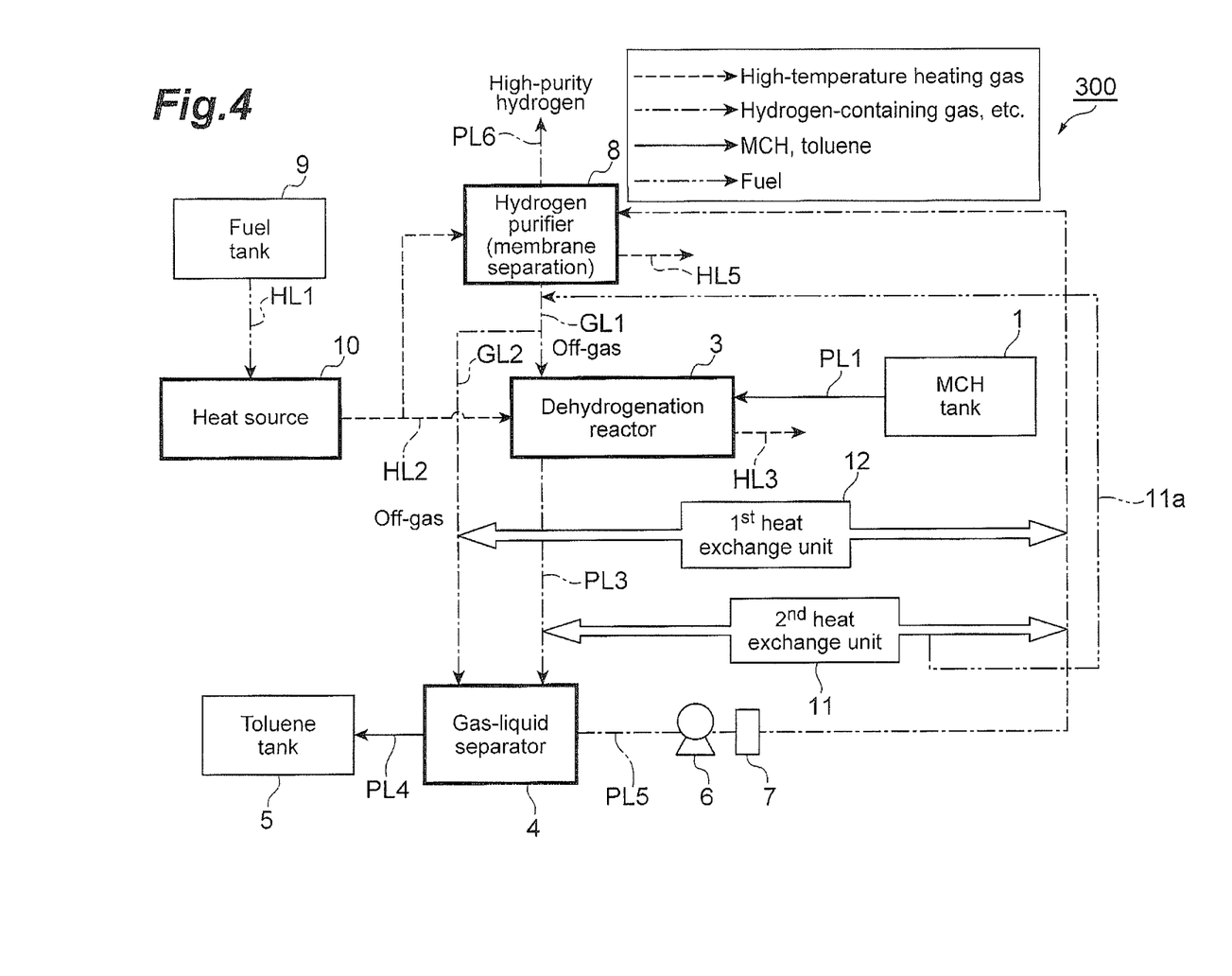
FIG. 4 is a block diagram illustrating a structure of a hydrogen supply system in accordance with a third embodiment of the present invention.

FIG. 4 is a block diagram illustrating a structure of a hydrogen supply system in accordance with the third embodiment of the present invention. The hydrogen supply system 300 in accordance with the third embodiment differs from the hydrogen supply system 200 in accordance with the second embodiment mainly in that the high-temperature heating gas from the heat source 10 splits in the middle so as to heat the hydrogen purifier 8 and dehydrogenation reactor 3 in parallel. The order of constituents on the material lines PL1 to PL6 is the same as that of the first embodiment (except that the vaporizer 2 and material line PL2 are omitted), and the off-gas lines GL1, GL2 are constructed as in the first embodiment.

Specifically, the high-temperature heating gas generated by the heat source 10 splits at a middle position of the heating line HL2, so as to be supplied to the hydrogen purifier 8 and dehydrogenation reactor. The high-temperature heating gas having split off toward the hydrogen purifier 8 provides heat for heating the hydrogen purifier 8 so that the latter attains a temperature suitable for membrane separation. The high-temperature heating gas emitted from the hydrogen purifier 8 is supplied through the heating line HL5 to an external device (not depicted). The high-temperature heating gas having split off to the dehydrogenation reactor 3 provides heat for heating the dehydrogenation reactor 3 for a dehydrogenation reaction which is an endothermic reaction. The high-temperature heating gas emitted from the dehydrogenation reactor 3 is supplied through the heating line HL3 to an external device (not depicted). Such a heating structure enables this embodiment to disregard the order of heating the hydrogen purifier 8 and dehydrogenation reactor 3, whereby the temperature of the hydrogen purifier 8 can be made higher or lower than or substantially the same as that of the dehydrogenation reactor 3 within an adjustable range.

The hydrogen supply system 300 in accordance with the third embodiment can set the hydrogen purifier 8 to a given temperature. Therefore, PdCu— and Nb-based metal membranes can be employed as a membrane when the heating structure of the hydrogen supply system 300 in accordance with this embodiment is adopted.

The hydrogen supply system 300 in accordance with the third embodiment also comprises the first and second heat exchange units 11, 12 and thus can yield operations and effects similar to those of the hydrogen supply system 200 in accordance with the second embodiment.

The present invention is not limited to the above-mentioned embodiments. For example, the off-gas line GL2 may be omitted, and the heat exchange units 11, 12 may also be omitted. While it is preferred for the heat exchange units 11, 12 to be provided in order to enhance the heat efficiency in the hydrogen supply system, structures in which heat exchange is performed in parts other than the heat exchange units 11, 12 can also enhance the heat efficiency in the hydrogen supply system.

The hydrogen supply systems in accordance with the above-mentioned embodiments may be employed for any use such as hydrogen stations, for example. That is, they can be utilized as hydrogen stations by connecting downstream of the hydrogen purifier a hydrogen supply device (including compression units, coolers, storage tanks, dispensers, etc.) for storing hydrogen and supplying hydrogen to external hydrogen consumption devices (such as fuel cell vehicles and hydrogen-powered vehicles). Hydrogen consumption devices may be connected downstream of the hydrogen purifier, so as to be supplied directly with hydrogen. For example, the hydrogen supply system may be utilized as the one for decentralized power sources (such as home power sources and emergency power sources).

In FIGS. 1, 3, and 4, the first heat exchange unit 11 supplies the hydrogen-containing gas directed from the gas-liquid separator 4 to the hydrogen purifier 8 with the heat of the hydrogen-containing gas directed from the dehydrogenation reactor 3 to the gas-liquid separator 4. Instead, depending on the temperature at which the membrane of the hydrogen purifier 8 operates, a line 11a indicated by the dash-double-dot line in each drawing may be used for supplying the heat to the hydrogen-containing gas in the off-gas line GL1. In this case, the first heat exchange unit 11 supplies the heat to a part in front of the split between the off-gas lines GL1, GL2.

INDUSTRIAL APPLICABILITY

The present invention can be utilized in a hydrogen supply system which supplies hydrogen.

REFERENCE SIGNS LIST

1: MCH tank; 2: vaporizer; 3: dehydrogenation reactor (reaction unit); 4: gas-liquid separator (gas-liquid separation unit); 5: toluene tank; 6: hydrogen purification compressor (compression unit); 7: gas-liquid separator; 8: hydrogen purifier (removal unit); 9: fuel tank; 10: heat source (heat supply unit); 11: first heat exchange unit; 12: second heat exchange unit; 100, 200, 300: hydrogen supply system; PL1 to PL6: material line; HL1 to HL4: heating line; GL1, GL2: off-gas line.

The invention claimed is:

1. A hydrogen supply system for supplying hydrogen, the hydrogen supply system comprising:
   a reaction unit for producing a hydrogen-containing gas by a dehydrogenation reaction of a starting material;
   a heat supply unit for supplying heat to the reaction unit;
   a removal unit for removing through membrane separation a dehydrogenation product from the hydrogen-containing gas produced by the reaction unit; and
   a first off-gas line for supplying a part or whole of an off-gas from the removal unit to the reaction unit.

2. A hydrogen supply system according to claim 1, further comprising a compression unit, disposed between the reaction unit and removal unit, for transferring under pressure the hydrogen-containing gas from the reaction unit to the removal unit;
   wherein the compression unit is adapted to transfer under pressure the off-gas passing through the first off-gas line to the reaction unit; and
   wherein only the compression unit disposed between the reaction unit and removable unit is the compression unit adapted to transfer under pressure the off-gas passing through the first off-gas line to the reaction unit.

3. A hydrogen supply system according to claim 1, further comprising:
   a gas-liquid separation unit, disposed between the reaction unit and removal unit, for separating the dehydrogenation product from the hydrogen-containing gas; and a second off-gas line for supplying a part or whole of the off-gas from the removal unit to the gas-liquid separation unit.

4. A hydrogen supply system according to claim 1, further comprising:
a gas-liquid separation unit, disposed between the reaction unit and removal unit, for separating the dehydrogenation product from the hydrogen-containing gas; and
a first heat exchange unit for supplying heat of the hydrogen-containing gas directed from the reaction unit to the gas-liquid separation unit to the hydrogen-containing gas directed from the gas-liquid separation unit to the removal unit or the hydrogen gas in the first off-gas line.

5. A hydrogen supply system according to claim 3 or 4, further comprising a second heat exchange unit for supplying heat of the off-gas passing through the second off-gas line for supplying a part or whole of the off-gas from the removal part to the gas-liquid separation unit to the hydrogen-containing gas directed from the gas-liquid separation unit to the removal unit.

6. A hydrogen supply system according to claim 1, connected to a hydrogen supply device for supplying hydrogen to an external hydrogen consumption device.

7. A hydrogen supply system according to claim 1, connected to a hydrogen consumption device.

* * * * *